US012586600B2

(12) United States Patent
Rybakov et al.

(10) Patent No.: US 12,586,600 B2
(45) Date of Patent: Mar. 24, 2026

(54) STREAMING VOCODER

(71) Applicant: Google LLC, Mountain View, CA (US)

(72) Inventors: Oleg Rybakov, Mountain View, CA (US); Liyang Jiang, Mountain View, CA (US); Fadi Biadsy, Mountain View, CA (US)

(73) Assignee: Google LLC, Mountain View, CA (US)

( * ) Notice: Subject to any disclaimer, the term of this patent is extended or adjusted under 35 U.S.C. 154(b) by 346 days.

(21) Appl. No.: 18/163,848

(22) Filed: Feb. 2, 2023

(65) Prior Publication Data

US 2023/0267949 A1 Aug. 24, 2023

Related U.S. Application Data

(60) Provisional application No. 63/312,195, filed on Feb. 21, 2022.

(51) Int. Cl.
*G10L 21/10* (2013.01)
*G10L 21/003* (2013.01)
(Continued)

(52) U.S. Cl.
CPC ............ *G10L 21/10* (2013.01); *G10L 21/003* (2013.01); *G10L 21/0232* (2013.01); *G10L 21/0364* (2013.01); *G10L 21/18* (2013.01)

(58) Field of Classification Search
CPC ... G10L 21/10; G10L 21/003; G10L 21/0232; G10L 21/0364; G10L 21/18
See application file for complete search history.

(56) References Cited

U.S. PATENT DOCUMENTS 10,529,349 B2 * 1/2020 Le Roux ................ G06N 3/084
10,726,856 B2 * 7/2020 Le Roux ............... G10L 19/032
(Continued)

FOREIGN PATENT DOCUMENTS

WO WO-2020171868 A1 * 8/2020 ............... G06N 3/08

OTHER PUBLICATIONS

Zhu, Xinglei, Gerald T. Beauregard, and Lonce L. Wyse, "Real-Time Signal Estimation From Modified Short-Time Fourier Transform Magnitude Spectra", Jul. 2007, IEEE Transactions on Audio, Speech, and Language Processing, vol. 15, No. 5, pp. 1645-1653. (Year: 2007).*
(Continued)

*Primary Examiner* — Daniel C Washburn
*Assistant Examiner* — James Boggs
(74) *Attorney, Agent, or Firm* — Honigman LLP; Brett A. Krueger; Grant Griffith

(57) ABSTRACT

A method includes receiving a current spectrogram frame and reconstructing a phase of the current spectrogram frame by, for each corresponding committed spectrogram frame in a sequence of M number of committed spectrogram frames preceding the current spectrogram frame, obtaining a value of a committed phase of the corresponding committed spectrogram frame and estimating the phase of the current spectrogram frame based on a magnitude of the current spectrogram frame and the value of the committed phase of each corresponding committed spectrogram frame in the sequence of M number of committed spectrogram frames preceding the current spectrogram frame. The method also includes synthesizing, for the current spectrogram frame, a new time-domain audio waveform frame based on the estimated phase of the current spectrogram frame.

26 Claims, 4 Drawing Sheets

(51) Int. Cl.

| | |
|---|---|
| ***G10L 21/0232*** | (2013.01) |
| ***G10L 21/0364*** | (2013.01) |
| ***G10L 21/18*** | (2013.01) |

(56) References Cited

U.S. PATENT DOCUMENTS

| | | | | |
|---|---|---|---|---|
| 11,017,763 | B1 * | 5/2021 | Aggarwal | G10L 13/08 |
| 11,462,209 | B2 * | 10/2022 | Arik | G10L 25/18 |
| 11,776,528 | B2 * | 10/2023 | Kang | G10L 21/043 704/200 |

OTHER PUBLICATIONS

Rybakov, Oleg, Marco Tagliasacchi, Yunpeng Li, Liyang Jiang, Xia Zhang, and Fadi Biadsy, "Real time spectrogram inversion on mobile phone", Aug. 2023, Interspeech 2023, pp. 4314-4118. (Year: 2023).*

Biadsy, Fadi, Ron J. Weiss, Pedro J. Moreno, Dimitri Kanvesky, and Ye Jia, "Parrotron: An End-to-End Speech-to-Speech Conversion Model and its Applications to Hearing-Impaired Speech and Speech Separation", Sep. 2019, Interspeech 2019, pp. 4115-4119. (Year: 2019).*

Průša, Zdeněk, Peter Balazs, and Peter Lempel Søndergaard, "A Noniterative Method for Reconstruction of Phase From STFT Magnitude", May 2017, IEEE/ACM Transactions on Audio, Speech, and Language Processing, vol. 25, No. 5, pp. 1154-1164. (Year: 2017).*

Průša, Zdeněk, and Pavel Rajmic, "Towards High Quality Real-Time Signal Reconstruction from STFT Magnitude", Apr. 2017, IEEE Signal Processing Letters, vol. 24, No. 6, pp. 892-896. (Year: 2017).*

Beauregard, Gerald T., Mithila Harish, and Lonce Wyse, "Single Pass Spectrogram Inversion", Jul. 2015, 2015 IEEE International Conference on Digital Signal Processing (DSP), pp. 427-431. (Year: 2015).*

Gerkmann, Timo, Martin Krawczyk-Becker, and Jonathan Le Roux, "Phase Processing for Single Channel Speech Enhancement: History and Recent Advances", Mar. 2015, IEEE Signal Processing Magazine, vol. 32, No. 2, pp. 55-66. (Year: 2015).*

Gnann, Volker, and Martin Spiertz, "Inversion of short-time fourier transform magnitude spectrograms with adaptive window lengths", Apr. 2009, 2009 IEEE International Conference on Acoustics, Speech and Signal Processing, pp. 325-328. (Year: 2009).*

International Search Report and Written Opinion for the related Application No. PCT/US2023/012239, dated May 9, 2023, 17 pages.

Xinglei Zhu et al: "Real-Time Iterative Spectrum Inversion with Look- Ahead", Proceedings / 2006 IEEE International Conference on Multimedia and Expo, ICME 2006 :Jul. 9-12, 2006, Hilton, Toronto, Toronto, Ontario, Canada, IEEE Service Center, Piscataway, NJ, Jul. 9, 2006 (Jul. 9, 2006}, pp. 229-232, XP032964721, 4 pages.

* cited by examiner

200

```
# Initialize magnitude and STFT sliding window
mag_w = tf.zeros((1, w_size, 1025), tf.float32)
stft_w = tf.zeros((1, w_size, 1025),
            tf.complex64)

def streaming_griffin_lim(mag_f,mag_w, stft_w):
  # 1) Inverse log
  mag_f = tf.exp(mag_f) - delta

  # 2) Magnitude frame to complex frame
  stft_f = tf.complex(mag_f, 0.0) * tf.exp(
      tf.complex(0.0, tf.zeros_like(mag_f)))

  # 3) Magnitude sliding window
  mag_w = tf.concat([mag_w, mag_f], 1)
  mag_w = mag_w[:, -w_size:, :]

  # 4) STFT sliding window
  stft_w = tf.concat([stft_w, stft_f], 1)
  stft_w = stft_w[:, -w_size:, :]

  commit_phase = tf.math.angle(
      stft_w[:, 0:ind, :])
  for _ in range(n_iters):  # GL iterations
    audio_w = tf.signal.inverse_stft(
        stft_w, frame_size, frame_step,
        fft_size, window_fn=None)
    stft_w = tf.signal.stft(
        audio_w, frame_size, frame_step,
        fft_size, window_fn=hann_window)
    uncommit_phase = tf.math.angle(
        stft_w[:, ind:w_size, :])
    phase_w = tf.concat([commit_phase,
        uncommit_phase], 1)
    stft_w = tf.complex(mag_w, 0.0) * tf.exp(
            tf.complex(0.0, phase_w))

  stft_o = stft_w[:,ind:ind+1,:] # Output frame
  return stft_o, mag_w, stft_w
```

FIG. 2

STREAMING VOCODER

CROSS-REFERENCE TO RELATED APPLICATIONS

This U.S. patent application claims priority under 35 U.S.C. § 119(e) to U.S. Provisional Application 63/312,195, filed on Feb. 21, 2022. The disclosure of this prior application is considered part of the disclosure of this application and is hereby incorporated by reference in its entirety.

TECHNICAL FIELD

This disclosure relates to a streaming vocoder

BACKGROUND

A speech-to-speech model can produce synthesized speech based on a source audio input. The last step of speech-to-speech conversion is generating audio samples at the desired sampling frequency, which can then be converted into synthesized speech through a vocoder. A common approach for generating these audio samples is called the Griffin-Lim algorithm, which is an iterative method that processes an entire audio sequence to generate output audio samples.

SUMMARY

One aspect of the disclosure provides a computer-implemented method that when executed by data processing hardware causes the data processing hardware to perform operations that include receiving a current spectrogram frame and reconstructing a phase of the current spectrogram frame by, for each corresponding committed spectrogram frame in a sequence of M number of committed spectrogram frames preceding the current spectrogram frame, obtaining a value of a committed phase of the corresponding committed spectrogram frame and estimating the phase of the current spectrogram frame based on a magnitude of the current spectrogram frame and the value of the committed phase of each corresponding committed spectrogram frame in the sequence of M number of committed spectrogram frames preceding the current spectrogram frame. The method also includes synthesizing, for the current spectrogram frame, a new time-domain audio waveform frame based on the estimated phase of the current spectrogram frame.

Implementations of the disclosure may include one or more of the following optional features. In some implementations, the current spectrogram frame includes a log-magnitude spectrogram frame output from a speech conversion model, and prior to reconstructing the phase of the current spectrogram frame, the phase of the current spectrogram frame is initialized with a value equal to zero. In some examples, the M number of committed spectrogram frames preceding the current spectrogram frame is equal to one. In other examples, the M number of committed spectrogram frames preceding the current spectrogram frame is at least two.

In some implementations, the phase of the current spectrogram frame further includes, for each corresponding uncommitted spectrogram frame in a sequence of N number of uncommitted spectrogram frames subsequent to the current spectrogram frame, obtaining a value of an uncommitted phase of the corresponding uncommitted spectrogram frame. Here, estimating the phase of the current spectrogram frame is further based on the value of the uncommitted phase of each corresponding uncommitted spectrogram frame in the sequence of N number of committed spectrogram frames subsequent to the current spectrogram frame. The N number of uncommitted spectrogram frames and the M number of committed spectrogram frames may be equal or different. The N number of committed spectrogram frames subsequent to the current spectrogram frame may be equal to one. Optionally, the N number of committed frames subsequent to the current spectrogram frame is at least two.

In some examples, the current spectrogram frame is in a Short-time Fourier transform (STFT) domain when reconstructing the phase of the current spectrogram frame. In these examples, synthesizing the new time-domain audio waveform frame based on the estimated phase of the current spectrogram frame may include running a streaming inverse STFT on an output frame corresponding to the current spectrogram frame. Here, the output frame may be extracted using the estimated phase of the current spectrogram frame.

In some implementations, the operations further include, after reconstructing the phase of the current spectrogram frame, designating the current spectrogram frame as a committed frame and storing the estimated phase of the current spectrogram frame as a committed phase. The data processing hardware may on a user computing device or a server.

Another aspect of the disclosure provides a system including data processing hardware and memory hardware in communication with the data processing hardware. The memory hardware stores instructions that when executed on the data processing hardware causes the data processing hardware to perform operations that include receiving a current spectrogram frame and reconstructing a phase of the current spectrogram frame by, for each corresponding committed spectrogram frame in a sequence of M number of committed spectrogram frames preceding the current spectrogram frame, obtaining a value of a committed phase of the corresponding committed spectrogram frame and estimating the phase of the current spectrogram frame based on a magnitude of the current spectrogram frame and the value of the committed phase of each corresponding committed spectrogram frame in the sequence of M number of committed spectrogram frames preceding the current spectrogram frame. The method also includes synthesizing, for the current spectrogram frame, a new time-domain audio waveform frame based on the estimated phase of the current spectrogram frame.

This aspect may include one or more of the following optional features. In some implementations, the current spectrogram frame includes a log-magnitude spectrogram frame output from a speech conversion model, and prior to reconstructing the phase of the current spectrogram frame, the phase of the current spectrogram frame is initialized with a value equal to zero. In some examples, the M number of committed spectrogram frames preceding the current spectrogram frame is equal to one. In other examples, the M number of committed spectrogram frames preceding the current spectrogram frame is at least two.

In some implementations, the phase of the current spectrogram frame further includes, for each corresponding uncommitted spectrogram frame in a sequence of N number of uncommitted spectrogram frames subsequent to the current spectrogram frame, obtaining a value of an uncommitted phase of the corresponding uncommitted spectrogram frame. Here, estimating the phase of the current spectrogram frame is further based on the value of the uncommitted phase of each corresponding uncommitted spectrogram frame in the sequence of N number of committed spectrogram frames subsequent to the current spectrogram frame. The N number of uncommitted spectrogram frames and the M number of committed spectrogram frames may be equal or different. The N number of committed spectrogram frames subsequent to the current spectrogram frame may be equal to one. Optionally, the N number of committed frames subsequent to the current spectrogram frame is at least two.

In some examples, the current spectrogram frame is in a Short-time Fourier transform (STFT) domain when reconstructing the phase of the current spectrogram frame. In these examples, synthesizing the new time-domain audio waveform frame based on the estimated phase of the current spectrogram frame may include running a streaming inverse STFT on an output frame corresponding to the current spectrogram frame. Here, the output frame may be extracted using the estimated phase of the current spectrogram frame.

In some implementations, the operations further include, after reconstructing the phase of the current spectrogram frame, designating the current spectrogram frame as a committed frame and storing the estimated phase of the current spectrogram frame as a committed phase. The data processing hardware may on a user computing device or a server.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2 is an example algorithm depicting the operations performed by the streaming vocoder.

Like reference symbols in the various drawings indicate like elements.

DETAILED DESCRIPTION

Speech-to-speech conversion systems are used to convert input speech into synthesized speech. This functionality has a variety of real world applications including language translation and converting atypical speech for speakers with impaired speech into canonical fluent speech. For the ideal user experience, speech-to-speech conversion should be quick (i.e., in real time) and computationally inexpensive such that it can be performed on a smart phone, a smart watch, or other similar device.

The present disclosure provides a streaming aware algorithm for inverting log magnitude spectrograms without mel transformation. That is, the present disclosure is directed toward receiving log magnitude spectrograms corresponding to a synthetic speech representation output from a speech-to-speech (S2S) model, and using a streaming vocoder to convert/invert the log magnitude spectrograms into time-domain audio waveforms in real-time. The time-domain audio waveforms correspond to audio packets of synthesized speech that may be audibly output from an acoustic speaker. While conventional vocoders used for waveform generation require entire audio sequences for processing, the techniques of the present disclosure can operate on portions of an input signal (i.e., individual frames of a log magnitude spectrogram) to process each portion (i.e., frame) incrementally. Accordingly, the streaming vocoder of the present disclosure is capable of converting log magnitude spectrograms output from the S2S model into time-domain audio waveforms in a streaming manner (i.e., the speech conversion happens in real-time). The resulting speech-to-speech model runs faster and requires less memory than known speech-to-speech systems, such as a neural vocoder.

Figure 1:
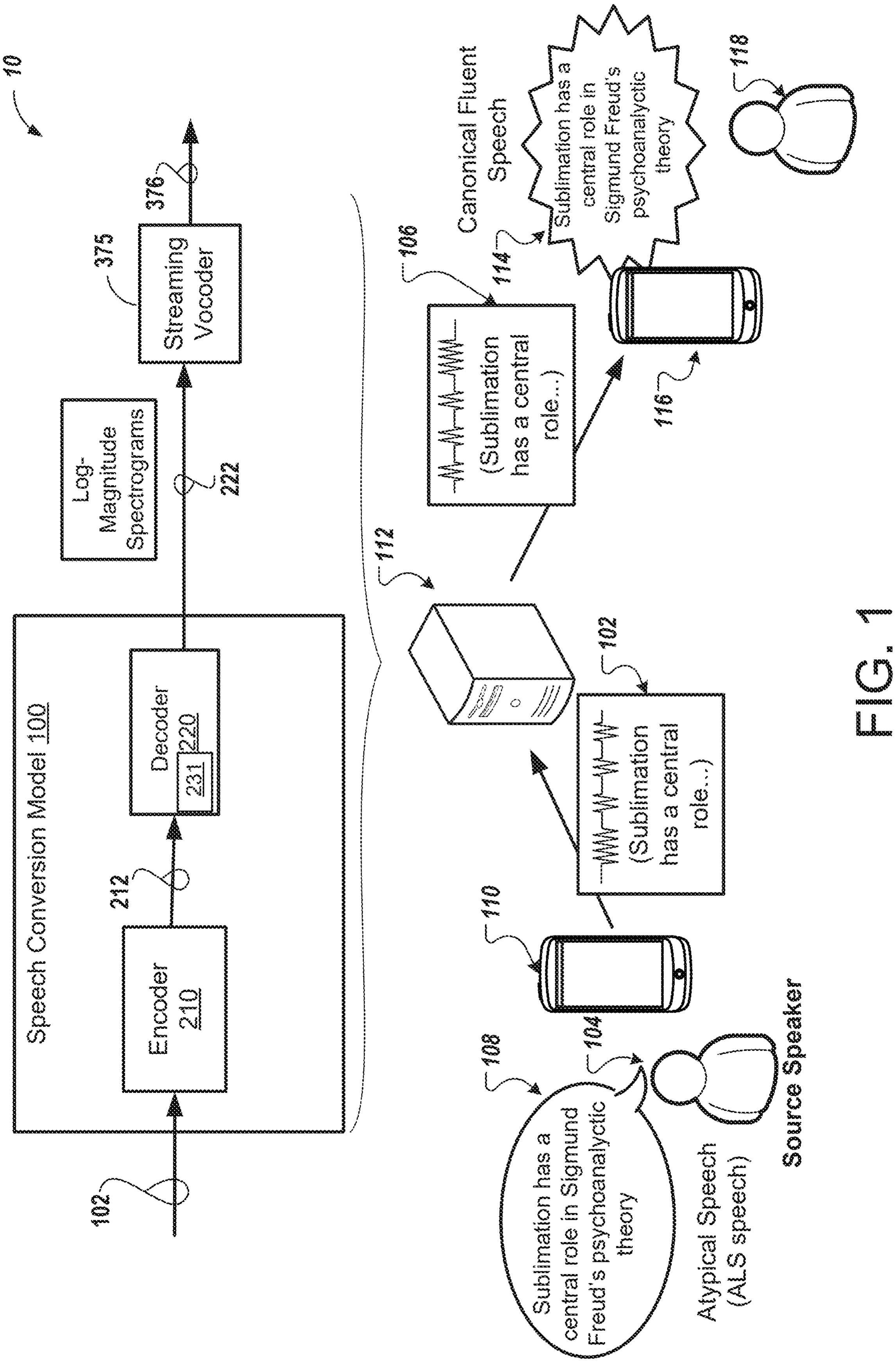
FIG. 1 is a schematic view of an example speech conversion system including a speech conversion model and a streaming vocoder.

FIG. 1 illustrates a speech conversion system 10 including a speech conversion model 100 and a streaming vocoder 375. The speech conversion model 100 is configured to convert input audio data 102 corresponding to an utterance 108 spoken by a source speaker 104 into output audio data 106 corresponding to a synthesized representation of the same utterance 114 spoken by the source speaker 104. As used herein, the input audio data 102 may include input spectrograms corresponding to the utterance 108. As used herein, the output audio data 106 includes output spectrograms 222 corresponding to the synthesized speech representation of the same utterance 114 or a time-domain audio waveform 376 converted from the output spectrograms 222 by the streaming vocoder 375. The output spectrograms 222 include a sequence of log magnitude spectrogram frames. While not shown, an acoustic front-end residing on the user device 110 may convert a time-domain audio waveform of the utterance 108 captured via a microphone of the user device 110 into the input spectrograms 102 or other type of audio data 102. In some implementations, the speech conversion model 100 of the speech conversion system 10 is configured to convert the input audio data 102 (e.g., input spectrogram) directly into the output audio data 106 (e.g., output spectrogram 222) without performing speech recognition, or otherwise without requiring the generation of any intermediate discrete representations (e.g., text or phonemes) from the input audio data 102.

The speech conversion model 100 includes an encoder 210 configured to encode the input spectrogram 102 into an encoded spectrogram 212 and a decoder 220 configured to decode the encoded spectrogram 212 into the output spectrogram 222 corresponding to the synthesized speech representation. In some examples, the input spectrogram 102 corresponds to raw audio of input speech spoken by a human and sampled at 16 kHz sampling frequency. From the input spectrogram 212, the speech conversion model computes a Short-time Fourier transform (STFT) with a fast Fourier transform (FFT) size of 2048, a frame size equal to 50 milliseconds (ms), a frame step equal to 12.5 ms, and Hann windowing. Each frame step of 12.5 ms may correspond to 200 samples at 16 kHz. The speech conversion model 100 then converts the complex-valued STFT into a real-valued spectrogram by computing the magnitude of each STFT coefficient. The speech conversion model 100 may further process the magnitude spectrogram with a logarithmic compression function applied element-wise with an added shift to produce the output log-magnitude spectrogram 222. The resulting log-magnitude spectrogram (i.e., output spectrogram 222) may be fed as input to the streaming vocoder 375. Implementations herein are directed toward the streaming vocoder 375 operating in a streaming mode by processing the log-magnitude spectrogram 222 frame-by-frame to generate corresponding output audio frames in the time domain with length equal to 12.5 ms (for 200 samples). Simply put, the capability of the streaming vocoder 375 to operate in streaming mode allows for real-time speech-to-speech conversion such that a new output audio frame corresponding to synthesized speech in the time domain is produced for each log magnitude spectrogram frame output by the S2S model 100.

The encoder 210 may include a stack of multi-head attention blocks (referred to herein as conformer blocks) which may include conformers or transformers. Each multi-head attention block may include a multi-head attention mechanism. The conformer blocks may be implemented by the encoder 210 to capture the fine-grained spectral patterns of incoming atypical speech. In these implementations, the encoder subsamples the input audio data 102 using a convolutional layer, and then processes the input audio data 102 with the stack of Conformer blocks. Each Conformer block may include a feed-forward layer, a self-attention layer, a convolution layer, and a second feed-forward layer. In some implementations, the encoder 210 includes a neural network architecture that is Long Short-Term Memory (LSTM) based. The above examples are not intended to be limiting and the encoder 210 can include any suitable structure to generate the encoded spectrogram 212 from the input spectrogram 102.

Further, the decoder 220 (i.e., a spectrogram decoder) may generate the output spectrogram 222 corresponding to the synthesized speech representation based on the encoded spectrogram 212 output from the encoder 210. The decoder 220 may include recurrent neural network-based architectures that each receive the encoded spectrogram 212 output by the encoder 210. The decoder 220 may include a cross-attention mechanism 231 configured to receive the encoded spectrogram 212 from the encoder 210. The decoder 220 may further process the encoded spectrogram 212 using a number of long-short term memory (LSTM) layers and/or a conversion layer. Implementations are directed toward the decoder 220 generating the output spectrogram 222 from the encoded spectrogram 212 directly without performing any intermediate text-to-speech conversion on a textual representation corresponding to a transcription of the utterance.

In some implementations, the speech conversion model 100 continuously generates the log-magnitude spectrogram frames 222 corresponding to synthesized speech representations of an utterance as the source speaker 104 speaks corresponding portions of the utterance. The vocoder 375 (also referred to interchangeably as a synthesizer 375) of the speech conversion system 10 is configured to convert each frame of the log-magnitude spectrogram frames 222 emitted by the decoder 220 into a corresponding time-domain waveform 376 of synthesized speech of the same utterance 114 for audible output from another computing device 116. Thus, with the speech conversion model 100 continuously generating the log-magnitude spectrogram frames 222 corresponding to synthesized speech representations of portions of the utterance 108 spoken by the source speaker 104, the streaming vocoder 375 is able to convert the log-magnitude spectrogram frames 222 into corresponding time-domain audio waveforms on a frame-by-frame basis such that the conversation of the source speaker's 104 into synthesized speech audibly output by the user 118 (or audience) may be more naturally paced. A time-domain audio waveform includes an audio waveform that defines an amplitude of an audio signal over time. A computing device 110 associated with the source speaker 104 may capture the utterance 108 spoken by the source speaker 104 and provide the corresponding input audio data 102 to the speech-to-speech conversion system 10 for conversion into the output spectrogram 222. The computing device 110 may include, without limitation, a smart phone, tablet, desktop/laptop computer, smart speaker, smart display, smart appliance, assistant-enabled wearable device (e.g., smart watch, smart headphones, smart glasses, etc.), or vehicle infotainment system. Thereafter, the speech conversion system 10 may employ the vocoder 375 to convert the output spectrogram 222 into a time-domain audio waveform 376 that may be audibly output from the computing device 110 or another computing device 116 as the utterance 114 of synthesized canonical fluent speech.

Alternatively, the other computing device 116 may be associated with down-stream automated speech recognition (ASR) system in which the speech conversion system 10 functions as a front-end to provide the output audio data 106 corresponding to the synthesized speech representation as an input to the ASR system for conversion into recognized text. The recognized text could be presented to the other user 118 and/or could be provided to a natural language understanding (NLU) system for further processing. The functionality of the speech conversion system 10 can reside on a remote server 112, on either or both of the computing devices 110, 116, or any combination of the remote server and computing devices 110, 116. The speech conversion system 10 could be distributed across multiple devices such that the speech conversion model 100 resides on one of the computing device 110 or the remote server 112 and the vocoder 375 resides on one of the remote server 112 or the other computing device 116.

In some implementations, the streaming vocoder 375 executes a streaming/real-time Griffin-Lim algorithm 200 for inverting magnitude spectrograms in streaming mode. FIG. 2 shows an example of the Griffin-Lim algorithm 200 depicting the operations performed by the streaming vocoder 375 for converting magnitude spectrograms into time-domain audio waveforms corresponding to synthesized speech. The algorithm 200 uses a sliding window queue in Short-time Fourier transform (STFT) domain, which inverts magnitude spectrograms 222 output from the speech conversion model 100 in a streaming mode. In short, the algorithm 200 is tasked with reconstructing/estimating a phase of each spectrogram frame using, as constraints, a corresponding phase of each previously committed frame among m number of previously committed frames and the magnitude of the spectrogram frame. The magnitude of the spectrogram frame is known and is the same over for each frame in the sliding window queue. Additionally, the algorithm may further use the current phase of each uncommitted spectrogram frame among n number of uncommitted frames subsequent to the current spectrogram frame. The N number of uncommitted spectrogram frames and the M number of committed spectrogram frames may be equal or different. In some examples, the N number of committed spectrogram frames subsequent to the current spectrogram frame 222 is equal to one. In other examples, the N number of committed spectrogram frames subsequent to the current spectrogram frame 222 is at least two.

The algorithm 200 receives, as input, the log magnitude spectrogram 222 (mag_f) (e.g., with size 1025, i.e., equal to the FFT size divided by two, plus one). Then, the algorithm 200 inverts the natural logarithm by exponentiating a current input magnitude frame (line 8 on FIG. 2). The magnitude spectrogram is converted to a complex-valued spectrogram by combining mag f with zero phase. A sliding window queue mag w is updated, by appending the current magnitude frame mag_f to the sequence of previously stored frames mag w and then keeping the latest w size frames. With this, mag_w always has a fixed number of w size frames with the last dimension equal to 1025. A sliding window queue stft_w is updated with the current complex-valued spectrogram, as described in the previous step.

The algorithm pre-computes the phase of committed frames (in line 22) and uses them as a phase constrain, so that phase of committed frames do not change during GL iterations below. A number of iterations (n_iters) GL iterations are executed based on the current content of the sliding window queues (line 24). Namely, this includes computing the inverse and forward STFT, estimating the uncommitted phase and recomputing stft_w by combining the committed phase (commit_phase) and the uncommitted phase (uncommit_phase) with the magnitude spectrogram (mag_w) (line 35 of FIG. 2). Notably, the sliding window queue permits the flow of information between committed and uncommitted frames for use in estimating the phase of a current uncommitted frames in the STFT domain. The output frame stft_o is extracted by reading the values of the STFT window queue stft_w at index ind. Where ind is an index of the current uncommitted frame in sliding window, so that all frames with indexes <ind and indexes >ind are committed and uncommitted (looking ahead) accordingly.

After using the algorithm 200 to reconstruct the phase of the current spectrogram frame 222, the current spectrogram frame may be designated as a committed frame and the estimated phase of the current spectrogram frame may be stored (i.e., on memory hardware of the remote server 12, on either or both of the computing devices 110, 116, or any combination of the remote server and computing devices 110, 116) as a committed phase.

The algorithm 200 executes in streaming mode whenever a new log magnitude spectrogram frame 222 output from the speech conversion model 100 is available. Once stft_o is computed, a new frame of 200 samples of audio are synthesized running the streaming inverse STFT. Notably, all iterations performed by the algorithm occur in the STFT domain. Opposed to neural network-based vocoders performing spectrogram inversion, the streaming vocoder 375 employing the algorithm 200 does not require any training.

Figure 3:
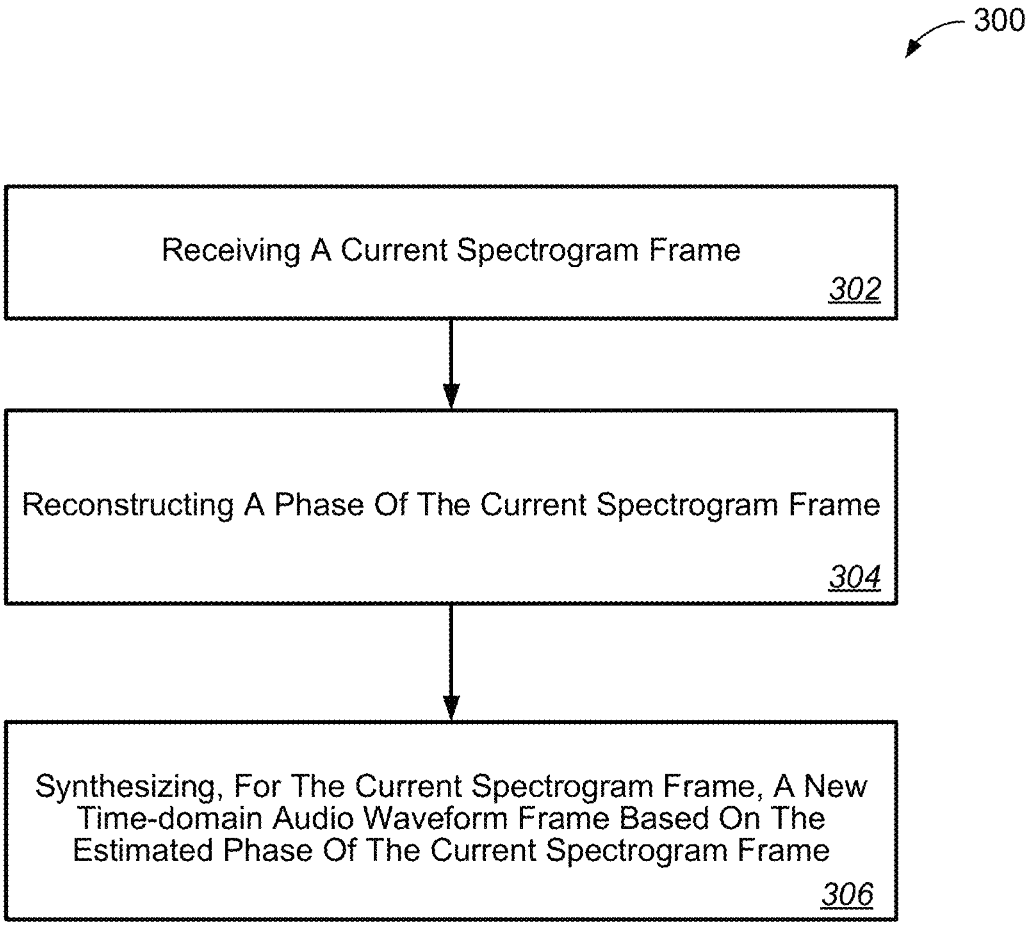
FIG. 3 is a flowchart of an example arrangement of operations for a method of performing real time spectrogram inversion for operating a vocoder in a streaming mode.

FIG. 3 is a flowchart of an example arrangement of operations for a method 300 of performing real time spectrogram inversion for operating a vocoder 375 in a streaming mode. The method 300 may execute on data processing hardware 410 (FIG. 4) based on instructions stored on memory hardware 420 (FIG. 4) that cause the data processing hardware 410 to perform the operations. The data processing hardware 410 and the memory hardware 420 may be implemented on the remote server 112 (FIG. 1), on either or both of the computing devices 110, 116 (FIG. 1), or any combination of the remote server and computing devices 110, 116.

At operation 302, the method 300 includes receiving a current spectrogram frame 222. The current spectrogram frame 222 may include a log-magnitude spectrogram frame output from a speech conversion model 100. The phase of the current spectrogram frame 222 may be initialized with a value equal to zero.

At operation 304, the method 300 includes reconstructing a phase of the current spectrogram frame. Reconstructing the phase of the current spectrogram frame includes, for each corresponding committed spectrogram frame in a sequence of M number of committed spectrogram frames preceding the current spectrogram frame, obtaining a value of a committed phase of the corresponding committed spectrogram frame. Thereafter, reconstructing the phase of current spectrogram frame also includes estimating the phase of the current spectrogram frame based on a magnitude of the current spectrogram frame and the value of the committed phase of each corresponding committed spectrogram frame in the sequence of M number of committed spectrogram frames preceding the current spectrogram frame.

At operation 306, the method 300 includes synthesizing a new time-domain audio waveform frame for the current spectrogram frame based on the estimated phase of the current spectrogram frame. The current spectrogram frame may be in a Short-time Fourier transform (STFT) domain when reconstructing the phase of the current spectrogram frame. Here, synthesizing the new time-domain audio waveform frame based on the estimated phase of the current spectrogram frame may include running a streaming inverse STFT on an output frame corresponding to the current spectrogram frame. The output frame may be extracted using the estimated phase of the current spectrogram frame.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 4:
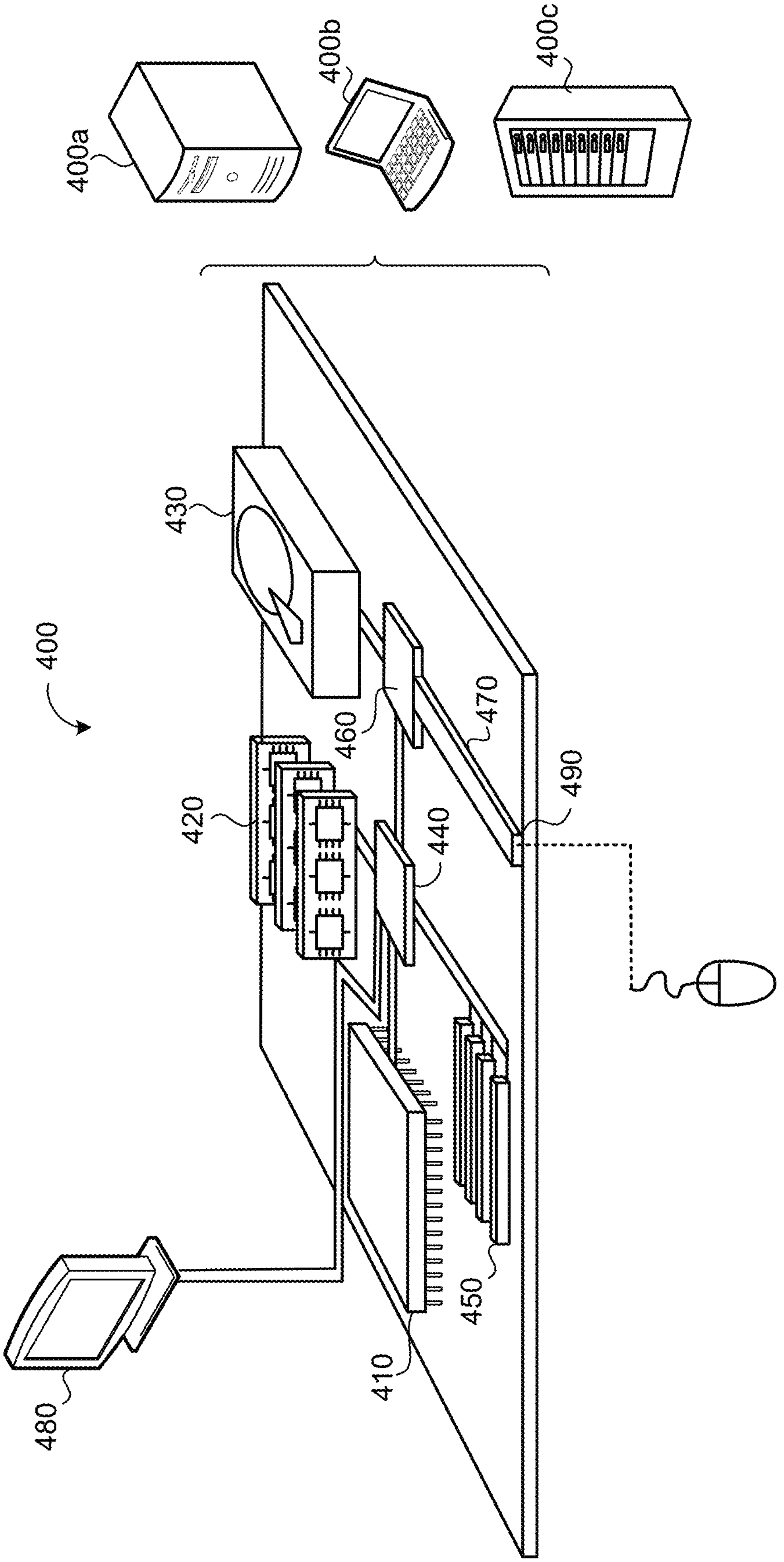
FIG. 4 is a schematic view of an example computing device that may be used to implement the systems and methods described herein.

FIG. 4 is a schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400*a* or multiple times in a group of such servers 400*a*, as a laptop computer 400*b*, or as part of a rack server system 400*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:

receiving a current spectrogram frame;

reconstructing a phase of the current spectrogram frame by:

for each corresponding committed spectrogram frame in a sequence of M number of committed spectrogram frames preceding the current spectrogram frame, obtaining a value of a committed phase of the corresponding committed spectrogram frame; and estimating the phase of the current spectrogram frame by performing one or more iterations within a sliding window that contains the current spectrogram frame, wherein performing each iteration of the one or more iterations within the sliding window comprises:

estimating an uncommitted phase of the current spectrogram frame based on a sequence of N number of uncommitted spectrogram frames within the sliding window that are subsequent to the current spectrogram frame; and updating a complex-valued spectrogram representation within the sliding window by combining the value of the committed phase of each corresponding committed spectrogram frame in the sequence of M number of committed spectrogram frames preceding the current spectrogram frame, the estimated uncommitted phase, and a magnitude of the current spectrogram frame; and for the current spectrogram frame, synthesizing a new time-domain audio waveform frame based on the estimated phase of the current spectrogram frame.

2. The method of claim 1, wherein:

the current spectrogram frame comprises a log-magnitude spectrogram frame output from a speech conversion model; and prior to reconstructing the phase of the current spectrogram frame, the phase of the current spectrogram frame is initialized with a value equal to zero.

3. The method of claim 1, wherein the M number of committed spectrogram frames preceding the current spectrogram frame is equal to one.

4. The method of claim 1, wherein the M number of committed spectrogram frames preceding the current spectrogram frame is at least two.

5. The method of claim 1, wherein estimating the uncommitted phase of the current spectrogram frame based on the N number of uncommitted spectrogram frames within the sliding window that are subsequent to the current spectrogram frame comprises:

for each corresponding uncommitted spectrogram frame in the sequence of N number of uncommitted spectrogram frames within the sliding window that are subsequent to the current spectrogram frame, obtaining a value of an uncommitted phase of the corresponding uncommitted spectrogram frame; and estimating the uncommitted phase of the current spectrogram frame is based on the value of the uncommitted phase of each corresponding uncommitted spectrogram frame in the sequence of N number of committed spectrogram frames within the sliding window that are subsequent to the current spectrogram frame.

6. The method of claim 1, wherein the N number of uncommitted spectrogram frames and the M number of committed spectrogram frames are equal.

7. The method of claim 1, wherein the N number of uncommitted spectrogram frames and the M number of committed spectrogram frames are different.

8. The method of claim 1, wherein the N number of uncommitted spectrogram frames within the sliding window that are subsequent to the current spectrogram frame is equal to one.

9. The method of claim 1, wherein the N number of uncommitted spectrogram frames within the sliding window that are subsequent to the current spectrogram frame is at least two.

10. The method of claim 1, wherein the current spectrogram frame is in a Short-time Fourier transform (STFT) domain when reconstructing the phase of the current spectrogram frame.

11. The method of claim 10, wherein synthesizing the new time-domain audio waveform frame based on the estimated phase of the current spectrogram frame comprises running a streaming inverse STFT on an output frame corresponding to the current spectrogram frame, the output frame extracted using the estimated phase of the current spectrogram frame.

12. The method of claim 1, wherein the operations further comprise, after reconstructing the phase of the current spectrogram frame, designating the current spectrogram frame as a committed frame and storing the estimated phase of the current spectrogram frame as a committed phase.

13. The method of claim 1, wherein the data processing hardware resides on a user computing device or a server.

14. A system comprising:

data processing hardware; and memory hardware in communication with the data processing hardware, the memory hardware storing instructions that when executed on the data processing hardware cause the data processing hardware to perform operations comprising:

receiving a current spectrogram frame;

reconstructing a phase of the current spectrogram frame by:

for each corresponding committed spectrogram frame in a sequence of M number of committed spectrogram frames preceding the current spectrogram frame, obtaining a value of a committed phase of the corresponding committed spectrogram frame; and estimating the phase of the current spectrogram frame by performing one or more iterations within a sliding window that contains the current spectrogram frame, wherein performing each iteration of the one or more iterations within the sliding window comprises:

estimating an uncommitted phase of the current spectrogram frame based on a sequence of N number of uncommitted spectrogram frames within the sliding window that are subsequent to the current spectrogram frame; and updating a complex-valued spectrogram representation within the sliding window by combining the value of the committed phase of each corresponding committed spectrogram frame in the sequence of M number of committed spectrogram frames preceding the current spectrogram frame, the estimated uncommitted phase, and a magnitude of the current spectrogram frame; and for the current spectrogram frame, synthesizing a new time-domain audio waveform frame based on the estimated phase of the current spectrogram frame.

15. The system of claim 14, wherein:

the current spectrogram frame comprises a log-magnitude spectrogram frame output from a speech conversion model; and prior to reconstructing the phase of the current spectrogram frame, the phase of the current spectrogram frame is initialized with a value equal to zero.

16. The system of claim 14, wherein the M number of committed spectrogram frames preceding the current spectrogram frame is equal to one.

17. The system of claim 14, wherein the M number of committed spectrogram frames preceding the current spectrogram frame is at least two.

18. The system of claim 14, wherein estimating the uncommitted phase of the current spectrogram frame based on the N number of uncommitted spectrogram frames within the sliding window that are subsequent to the current spectrogram frame comprises:

for each corresponding uncommitted spectrogram frame in the sequence of N number of uncommitted spectrogram frames within the sliding window that are subsequent to the current spectrogram frame, obtaining a value of an uncommitted phase of the corresponding uncommitted spectrogram frame; and estimating the uncommitted phase of the current spectrogram frame is further-based on the value of the uncommitted phase of each corresponding uncommitted spectrogram frame in the sequence of N number of committed spectrogram frames within the sliding window that are subsequent to the current spectrogram frame.

19. The system of claim 14, wherein the N number of uncommitted spectrogram frames and the M number of committed spectrogram frames are equal.

20. The system of claim 14, wherein the N number of uncommitted spectrogram frames and the M number of committed spectrogram frames are different.

21. The system of claim 14, wherein the N number of uncommitted spectrogram frames within the sliding window that are subsequent to the current spectrogram frame is equal to one.

22. The system of claim 14, wherein the N number of uncommitted spectrogram frames within the sliding window that are subsequent to the current spectrogram frame is at least two.

23. The system of claim 14, wherein the current spectrogram frame is in a Short-time Fourier transform (STFT) domain when reconstructing the phase of the current spectrogram frame.

24. The system of claim 23, wherein synthesizing the new time-domain audio waveform frame based on the estimated phase of the current spectrogram frame comprises running a streaming inverse STFT on an output frame corresponding to the current spectrogram frame, the output frame extracted using the estimated phase of the current spectrogram frame.

25. The system of claim 14, wherein the operations further comprise, after reconstructing the phase of the current spectrogram frame, designating the current spectrogram frame as a committed frame and storing the estimated phase of the current spectrogram frame as a committed phase.

26. The system of claim 14, wherein the data processing hardware resides on a user computing device or a server.

* * * * *